United States Patent [19]
Butcher et al.

[11] Patent Number: 6,036,743
[45] Date of Patent: Mar. 14, 2000

[54] METHOD AND APPARATUS FOR REMOVING LIQUID SALTS FROM LIQUID METAL

[75] Inventors: Kenneth R. Butcher, Hendersonville; Leonard S. Aubrey, Arden, both of N.C.

[73] Assignee: Selee Corporation, Hendersonnville, N.C.

[21] Appl. No.: 08/957,930

[22] Filed: Oct. 27, 1997

[51] Int. Cl.[7] ....................................................... C22B 9/02
[52] U.S. Cl. ................................. 75/407; 266/227; 75/412
[58] Field of Search ....................... 75/407, 412; 266/227

[56] References Cited

U.S. PATENT DOCUMENTS

| | | |
|---|---|---|
| 2,997,402 | 8/1961 | McDonald et al. . |
| 4,317,679 | 3/1982 | Dantzig et al. . |
| 4,343,704 | 8/1982 | Brockmeyer . |
| 4,390,364 | 6/1983 | Yu . |
| 4,790,873 | 12/1988 | Gesing et al. . |
| 5,104,095 | 4/1992 | Elliott et al. ............................. 266/230 |
| 5,122,184 | 6/1992 | Eckert et al. . |
| 5,226,950 | 7/1993 | Yu . |
| 5,336,295 | 8/1994 | DeYoung et al. . |
| 5,569,845 | 10/1996 | Butcher et al. . |
| 5,673,902 | 10/1997 | Aubrey et al. . |

FOREIGN PATENT DOCUMENTS 1 266 500   3/1972   United Kingdom .

*Primary Examiner*—Melvyn Andrews
*Attorney, Agent, or Firm*—Carter & Schnedler

[57] ABSTRACT

There is provided a method and apparatus for removing liquid salts from liquid metal utilizing at least one porous substrate which is wettable by liquid salts and is not wettable by liquid metal. The porous substrate is inserted into a container having a quantity of liquid metal which is contaminated with an amount of liquid salt. The salt contaminated liquid metal contacts the substrate so that the liquid salt is absorbed into the porous substrate. The salt wetted porous substrate is then removed from the container.

19 Claims, 6 Drawing Sheets

METHOD AND APPARATUS FOR REMOVING LIQUID SALTS FROM LIQUID METAL

BACKGROUND OF THE INVENTION

This invention relates to metal filtration. More particularly, it relates to the removal of molten salt inclusions from liquid metal during metal filtration.

The refining of molten aluminum to produce critical aluminum products typically consists of a two stage process. The first stage involves treating the molten aluminum in a degassing system with a mixture of an inert carrier gas, which is usually argon, along with chlorine, primarily for the removal of hydrogen, soluble alkaline metal impurities and certain large inclusions which are normally present in the molten aluminum. The process for removing hydrogen is called degassing. The details of one degassing process is taught in U.S. Pat. No. 4,317,679, which is assigned to SELEE Corporation, assignee of the present invention. In addition, there are other degassing processes.

The second and final stage consists of filtration, typically with a ceramic foam filter, bed filter, or rigid media filter, to remove the remaining solid inclusion particles which exist in the molten aluminum.

To obtain optimum quality requires careful control of the chlorine levels in the degasser in order to obtain adequate alkaline metal and hydrogen removal. If excess chlorine is used beyond that required for trace alkaline metal and hydrogen removal, then the potential exists for excess liquid salt generation, which principally is magnesium chloride. That is, if excess chlorine is used beyond that required for the removal of the trace alkaline elements and hydrogen, then excessive quantities of liquid magnesium chloride inclusions will be generated.

In addition, other salts or mixtures of salts, including chlorides and fluorides, may be formed.

A well designed, maintained and properly operating degassing system is capable of generating very small argon gas bubbles. Liquid salt droplets occur on the surface of the argon gas bubbles and can be sheared from the surface of the argon bubbles. The size of the liquid salt droplets may range from 1 to 50 microns, and, even though the salt droplets are significantly less dense than molten aluminum, they tend to remain suspended in the molten aluminum due to their size. The suspended salt droplets, over time, tend to grow because of collisions with other droplets and coalescence. These liquid salt particles cannot be reliably removed with conventional filtration technology and can result in oxide patches which create problems for the final aluminum product. Small magnesium chloride droplet inclusions can result in surface patches of oxides of aluminum and magnesium which can result in edge cracking during the subsequent rolling of the aluminum.

One approach to this problem is to monitor the amount of liquid salt inclusions in the molten metal and to use this information to control the degasser. One such monitor system is described in U.S. Pat. No. 5,569,845, assigned to SELEE Corporation, assignee of the present invention.

While the monitor and control approach represents an advance in the art, it is desirable to remove any liquid salt inclusions which may be present in the molten aluminum. The presence of the liquid salt can have a significant impact on the reliability and efficiency of the solid inclusion filter, and can result in significant deterioration in the performance of the ceramic foam filter. As little as 100 parts per million ("ppm") of liquid salt can reduce the capture efficiency of a ceramic foam filter from a range of 70% to 80% to a range of 25% to 40%. It is believed that this reduction in filtration efficiency is caused by the liquid salt coating the inclusion particles, which significantly alters the interfacial surface energy relationship between the inclusions, the molten aluminum and the filter.

Technology currently exists which attempts to separate liquid salts from liquid aluminum by coalescing the small salt particles and removing the coalesced liquid salt by floatation. U.S. Pat. Nos. 4,390,364, 5,122,184 and 5,336,295 deal with the removal of liquid salts by the use of ceramic foam or packed beds as a coalescent medium in order to enhance separation by floatation. U.S. Pat. No. 4,790,873 shows a staged filtration system where the upward flow through the first stage filter serves to coalesce fine salt particles and subsequently release them as large conglomerates which will more readily separate by floatation.

OBJECTS OF THE INVENTION

It is therefore one object of this invention to provide an improved apparatus for removing liquid salts from liquid metal.

It is another object of this invention to provide an improved method for removing liquid salts from liquid metal.

It is still another object of this invention to provide an apparatus for removing liquid salts from liquid metal which is inexpensive to produce and easy to use.

It is yet another object of this invention to provide a method and apparatus for removing liquid salts from liquid metals which does not require a substantial modification to existing metal production facilities.

It is also another object of this invention to provide an apparatus for removing liquid salts from liquid metals which may readily be utilized with standard metal filtration technology.

SUMMARY OF THE INVENTION

In accordance with one form of this invention, there is provided a filter for removing liquid salts from liquid metal. The filter includes at least one substrate having an outer surface. The outer surface of the substrate has a plurality of pores therein. The porous substrate is made from a material which is wetted by liquid salts and not wetted by liquid metal so that liquid salts may be separated from the liquid metal. Preferably, the pore sizes range from 5 to 120 microns in diameter. The substrate may be a ceramic foam filter having pores in the filter structure. Alternatively, the substrate may be a plate having these small pores therein for absorbing liquid salts. The plate may have larger passageways for permitting liquid metal to pass therethrough. Also, the filter may comprise a plurality of substrates which may be in the form of porous pellets to be placed in a pile directly on top of, or adjacent to, a ceramic foam filter or other solid inclusion filtration device. In addition, the filter may comprise a plurality of closely spaced parallel porous plates which permit the metal to flow by.

In the embodiments where the liquid salt removal filter is not also itself used as the primary solid inclusion removal filter, the liquid salt removal filter should be placed upstream in the metal flow from the primary solid inclusion removal filter. Also, the liquid salt removal filter may be placed between two conventional ceramic foam filters in a staged filter bowl.

In accordance with another form of this invention, there is provided a method for separating liquid salts from liquid metal utilizing at least one porous substrate which is wettable by liquid salts and non-wettable by liquid metal which includes the steps of: inserting the porous substrate into a container; adding a quantity of liquid metal which is contaminated with an amount of liquid salt to the container; contacting the substrate with a substantial amount of the salt contaminated liquid metal; wetting the porous substrate with liquid salt; absorbing liquid salt into the substrate; and removing the salt wetted porous substrate from the container. Preferably, the liquid metal contacts the substrate by moving the liquid metal through the substrate either through passageways in the substrate or around and through passageways created by a plurality of substrates which may be in the form of pellets, spheres, or other irregular shapes.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENTS

In general, the invention includes at least one substrate, such as a ceramic body which is capable of separating liquid salts, such as magnesium chloride, from liquid metal, such as aluminum. The substrate is formed primarily from a porous material having surfaces which are wetted by liquid salts, but not wetted by liquid aluminum. The preferred materials are ceramic materials, such as a boron glass based material which is described in U.S. Pat. No. 2,997,402 issued to Dore and McDonald which is incorporated herein by reference. Other ceramic materials, such as aluminum nitride, calcium oxide, aluminum titanate and graphite, may also be used.

In order for the liquid salt wetted substrate to absorb and retain the liquid salt, it includes micro pores, at least on its outer surface. The liquid salts are absorbed into the porous substrate by capillary action. It is preferred that the range of sizes of the micro pores be from about 5 microns to 120 microns, however, it is believed that other pore sizes, in particularly larger pore sizes, will enable the liquid salts to be absorbed into the substrate.

The physical form of the substrate may take any shape which is convenient, so long as there is good exposure of the liquid metal to the surface of the substrate. For example, the substrate may be made in the form of ceramic foam, loose pellets or spheres, irregular media, or plates with pressed or excluded channels therethrough, or a series of parallel plates which allow the liquid metal to flow over the surfaces of the plates.

It is preferred that the substrate be placed directly in the flow path of liquid metal, such as, for example, molten aluminum, so that a substantial amount of the liquid metal comes in contact with the surface or surfaces of the substrate. In one embodiment of the invention, there is provided a plurality of substrates in the form of loose pellets, which have micro pores.

Figure 1:
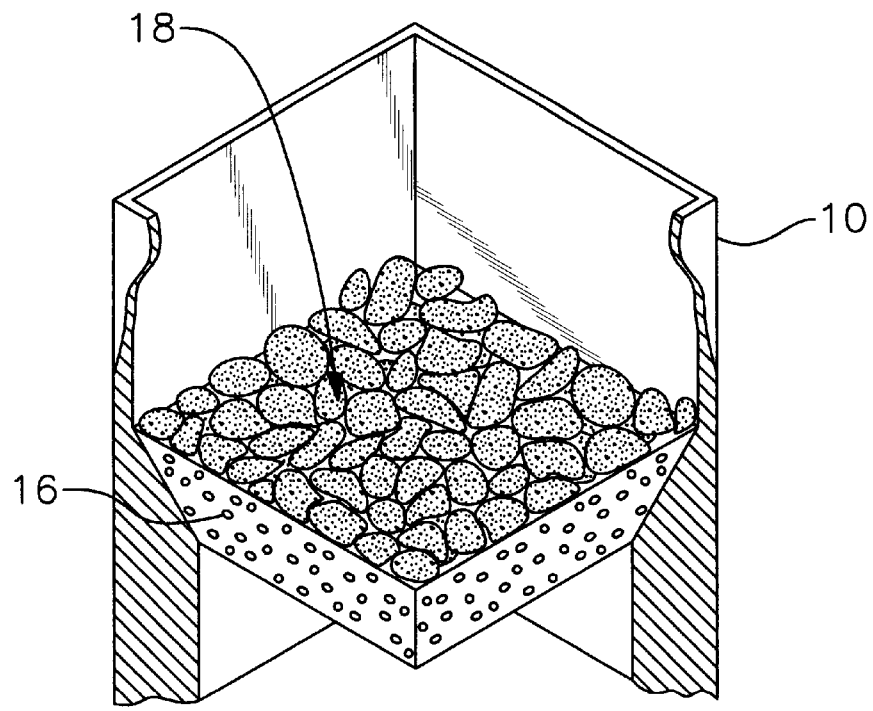
FIG. 1 is a partial pictorial view showing one embodiment of the invention.
Figure 2:
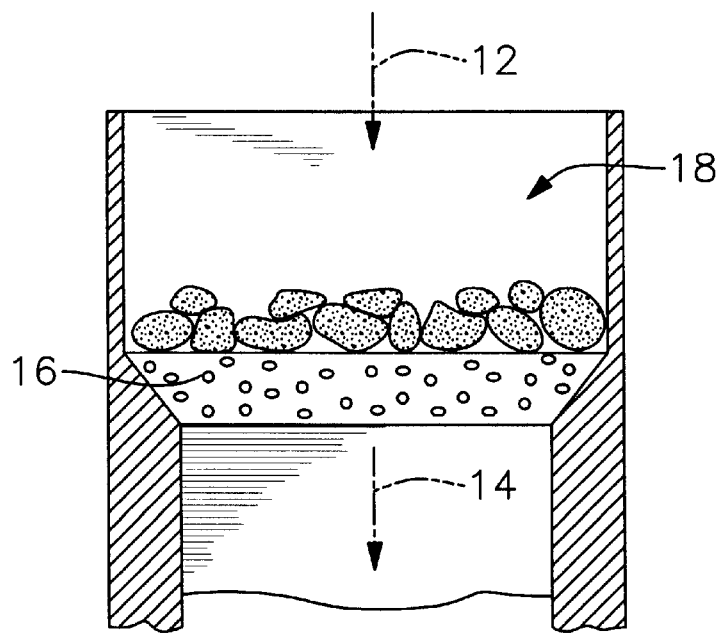
FIG. 2 is a side elevational view of the embodiment of FIG. 1.

Referring now more particularly to FIGS. 1 and 2, there is provided a container 10 for receiving liquid metal. The flow direction of the liquid metal is indicated in FIG. 2 by arrows 12 and 14. The liquid metal is preferably aluminum which is contaminated with a molten salt, such as magnesium chloride. As previously described, this contamination normally occurs due to the addition of chlorine for removing hydrogen during degassing.

A standard ceramic foam filter 16 is received in container 10 and is arranged so that all of the molten metal passes therethrough. A typical ceramic filter is described in U.S. Pat. No. 4,343,704 which is assigned to SELEE Corporation, assignee of the present invention and which is incorporated herein by reference.

A plurality of porous substrates in the form of pellets 18 have been placed in a pile on top of and upstream of ceramic foam filter 16 so that the molten metal makes contact with the substrates prior to making contact with the ceramic foam filter 16. The molten metal will flow between the gaps in the pile of pellets 18 so that a substantial amount of salt contaminated molten metal is exposed to the porous surfaces of the pellets. The pellets are preferably made of a ceramic material, such as boron glass, which is not wetted by molten aluminum, but which is wetted by liquid salts. A boron glass which has been used is Ferro Frit 3249, which is commercially available from Ferro Corporation. The composition of Ferro Frit 3249 is as follows: 3.5 weight % CaO, 12.2 weight % MgO, 13.3 weight % $Al_2O_3$, 28.9 weight % $B_2O_3$, and 42.1 weight % $SiO_2$. Due to the porosity of the material, the liquid salts are absorbed into the substrates by the capillary action of the micro pores. Thus, the liquid salts from the contaminated metal are absorbed directly onto the outer surface of the pellets, thereby separating the liquid salts from the liquid metal prior to the liquid metal coming into contact with ceramic foam filter 16. After a period of time, the pellets will become fully loaded with liquid salts. The pellets are then removed from container 10 and new pellets are added to the container and additional liquid salt contaminated liquid metal is poured through the container, again, in the directions shown by arrows 12 and 14.

Figure 3:
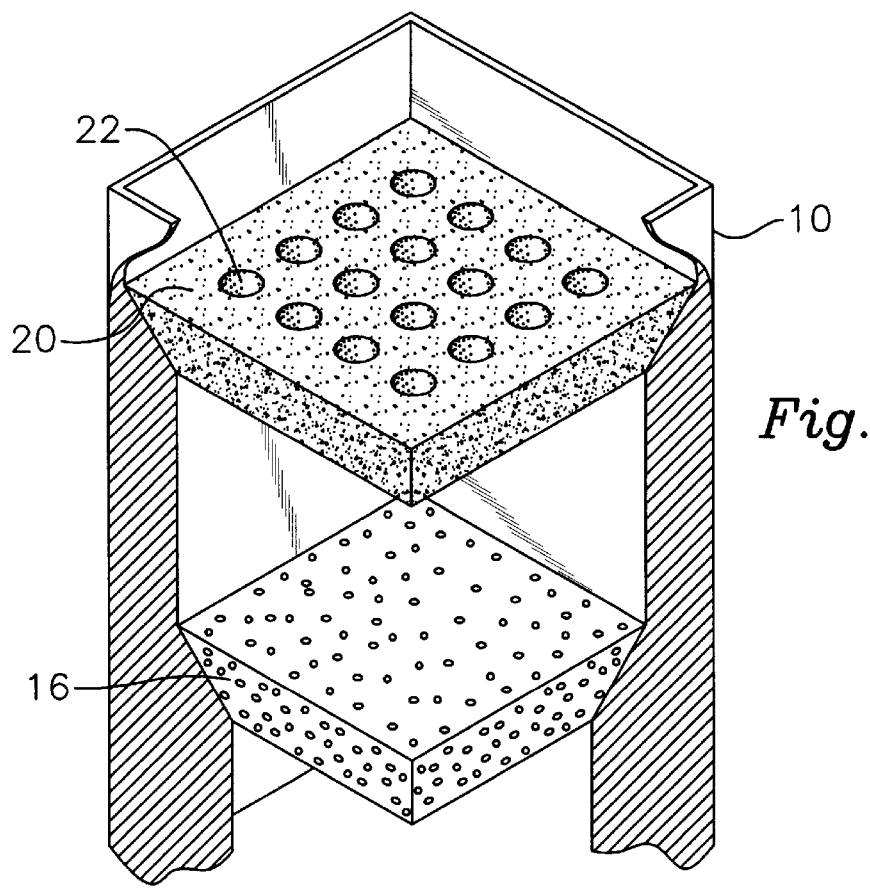
FIG. 3 is a partial pictorial view showing another embodiment of the invention.
Figure 4:
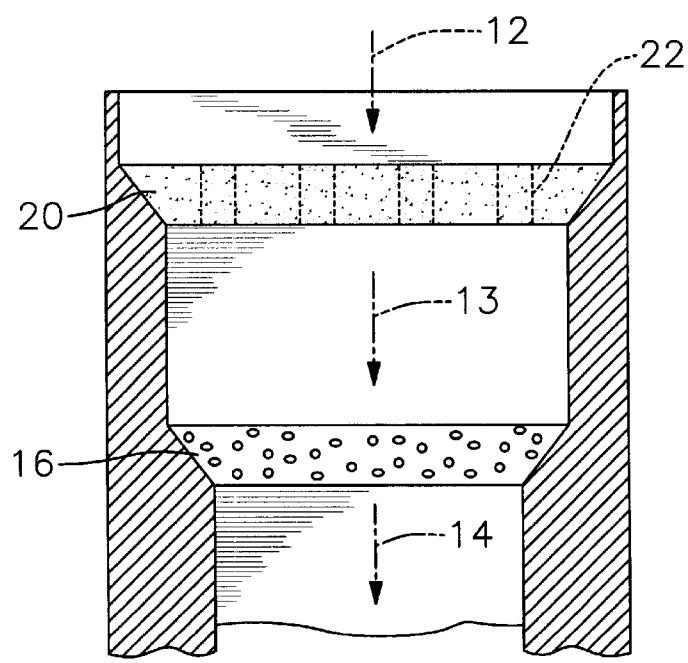
FIG. 4 is a side elevational view of the embodiment of FIG. 3.

FIGS. 3 and 4 show another embodiment of the invention, whereby a plate 20 is substituted for porous pellets 18. Plate 20 may be made from the same ceramic materials as pellets 18.

A plurality of channels 22 have been formed in plate 20 to permit molten metal to readily pass through the plate.

Plate 20 is made from a material which is not wetted by liquid aluminum, but is wetted by liquid salts. Plate 20, however, contains micro pores, at least on the outer surface thereof so that the liquid salts are absorbed into the plate. As can be seen in FIG. 4, plate 20 is placed in container 10 upstream from foam filter 16, as indicated by arrows 12, 13, and 14.

Figure 8:
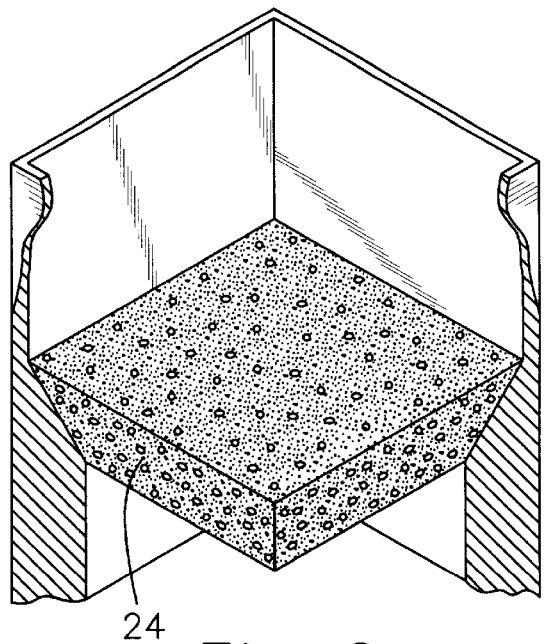
FIG. 8 is a partial pictorial view of still another embodiment of the invention.
Figure 9:
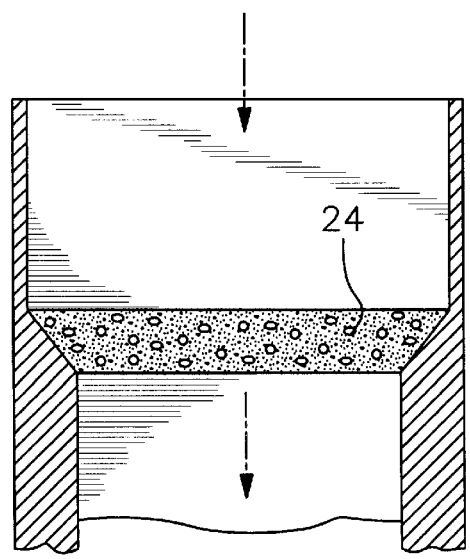
FIG. 9 is a side elevational view of FIG. 8.

FIGS. 8 and 9 show another embodiment of the invention, whereby a single element, namely, ceramic foam filter 24 is utilized to perform both the standard solid inclusion filtration function, as well as the function of the subject invention, namely, the separation of liquid salts from liquid metal. In this embodiment, the reticulated structure of the filter itself has been made micro porous so that the structural walls of the ceramic foam filter 24, being not wetted by liquid metal, but wetted by liquid salts, will serve to absorb the liquid salts, again, by capillary action of the micro pores.

Figure 5:
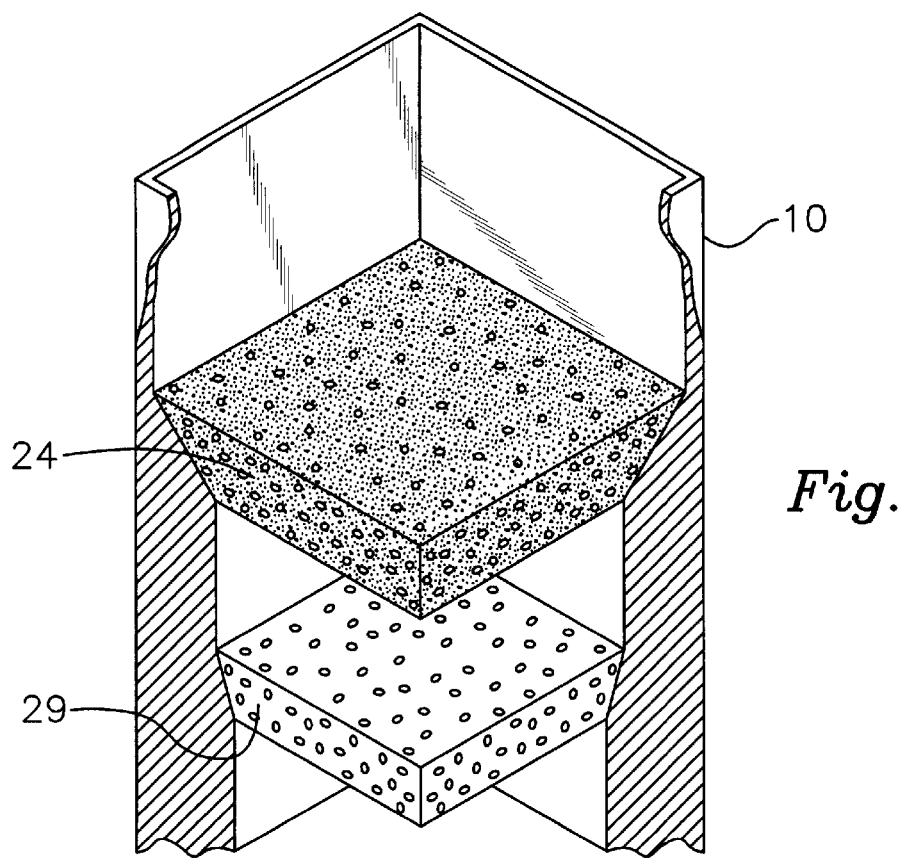
FIG. 5 is a partial pictorial view of yet another embodiment of the invention.
Figure 6:
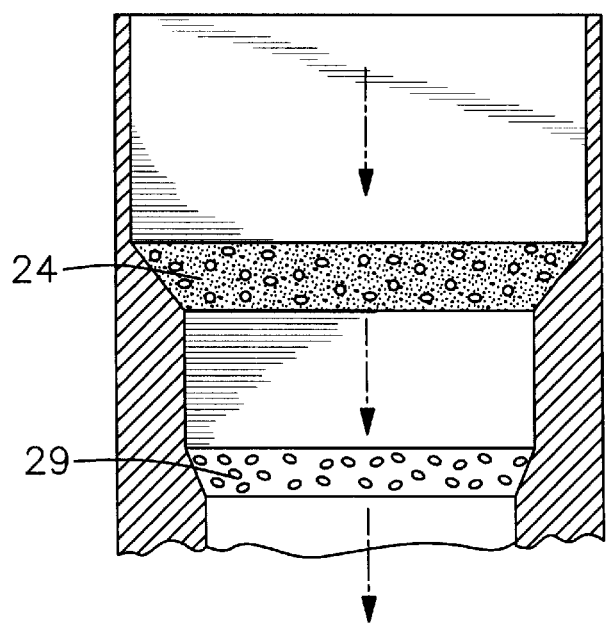
FIG. 6 is a side elevational view of the embodiment of FIG. 5.

FIGS. 5 and 6 show still another embodiment of the invention which is similar to the embodiment of FIGS. 8 and 9, except that micro porous ceramic form filter 24 is placed upstream of a standard ceramic foam filter 29 so that the micro porous ceramic foam filter 24 performs the function of liquid salts/liquid metal separation of the subject invention, while the standard ceramic foam filter 29 performs the function of filtering solid inclusions.

Figure 7:
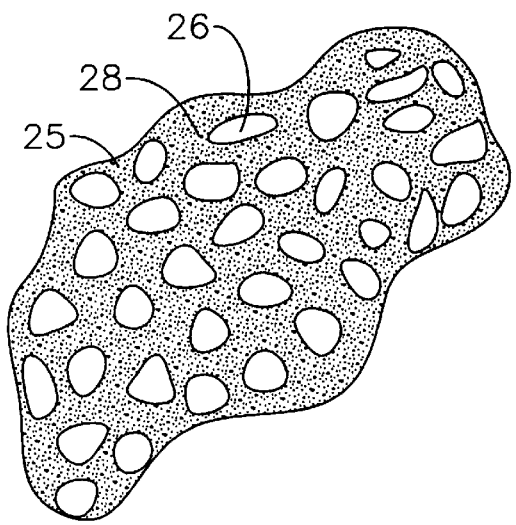
FIG. 7 is a detail view of a portion of the embodiment of FIGS. 5 and 8.

FIG. 7 is a partial plan view showing a magnified view of a portion of the filter 24. As can be seen, filter 24 includes a plurality of passageways 26 which extend through the filter in a tortuous path so as to pick up inclusions from the liquid metal. The solid reticulated branches 25 of filter 24 include a plurality of micro pores 28 which are opened on the outer surface of the filter. Preferably, these micro pores are in the range of 5 to 120 microns in diameter. Preferably, the passageways 26 are in the range of 0.01 to 10 millimeters in diameter so that molten metal may freely pass therethrough without undue resistance.

Figure 10:
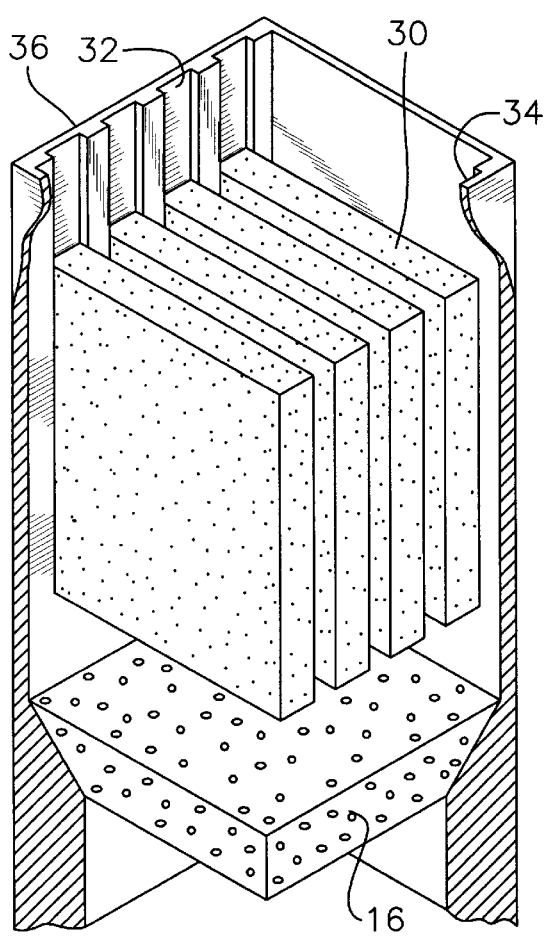
FIG. 10 is a partial pictorial view of yet another embodiment of the invention.
Figure 11:
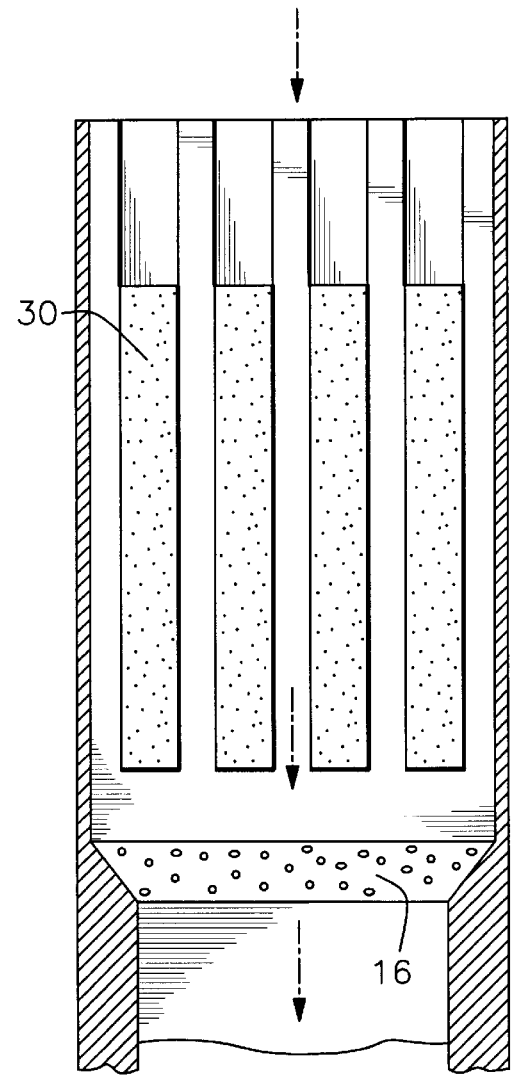
FIG. 11 is a side elevational view of FIG. 10.
Figure 12:
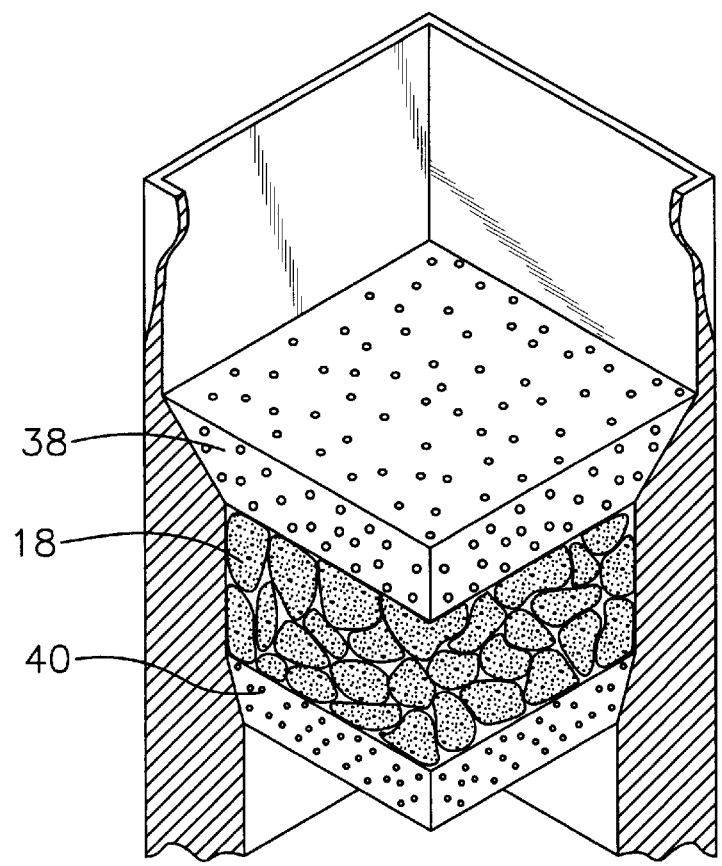
FIG. 12 is a partial pictorial view of still another embodiment of the invention.
Figure 13:
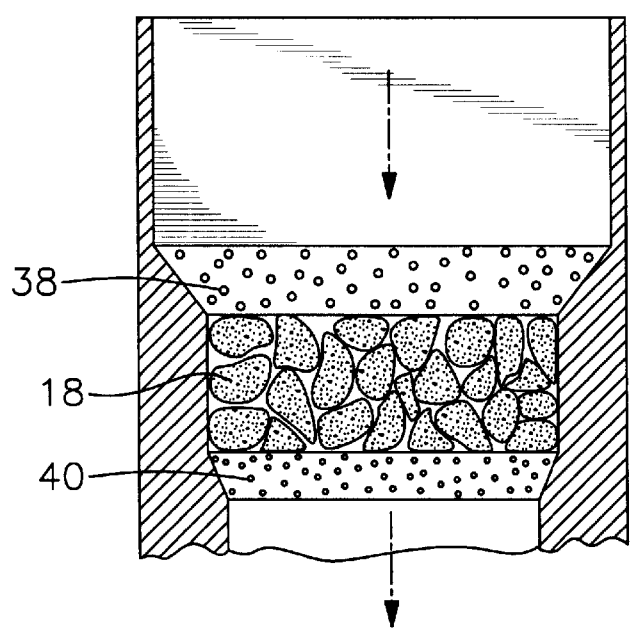
FIG. 13 is a side elevational view of FIG. 12.

FIGS. 10 and 11 show another embodiment of the invention where a plurality of closely spaced parallel micro porous plates 30 are placed upstream of standard ceramic foam filter 16 so that liquid metal may pass by and make contact with the porous surfaces of the plates. Grooves 32 and 34 in the walls 36 of container 10 hold the plates 30 in place. FIGS. 12 and 13 show a dual stage ceramic foam filtration system utilizing a coarse filter 38 as the upstream filter and a fine filter 40 as the downstream filter, and with a plurality of micro porous pellets 18 sandwiched between ceramic foam filters 38 and 40. The dual stage ceramic foam filtration system is constructed in accordance with the teachings of U.S. Pat. No. 5,673,902, except that the gap distance between the two ceramic foam filters has been increased in order to provide space for the pellets 18. U.S. Pat. No. 5,673,902 is assigned to SELEE Corporation, assignee of the present invention, and is hereby incorporated herein by reference.

The staged filter element arrangement provides a support structure for mechanically retaining the pellets 18. It is preferred that the coarse filter 38 have a porosity in the range of 20 to 60 pores per inch ("ppi") and that the fine filter 40 have a porosity in the range of 40 to 100 ppi.

EXAMPLE 1

A flat micro porous substrate 20 was fabricated by preparing a ceramic slurry consisting of 398 grams virginia kyanite, 65 grams talc, 24 grams dicalcium phosphate, 4 grams mineral colloid, 2 grams kelzan starch, 7 grams darvon D-811 wetting agent, 149 grams colloidal silica, 9 grams glycerine, 172 grams alpha alumina (Alcoa A-12), 105 grams water. To this ceramic slurry was added 134 grams of walnut flour and 75 grams of acrylic binder (Duramax B1001) and 250 additional grams of water. The amount and size of walnut flour added will determine the number and the approximate size of micro pores created. The slurry and formed into the shape of a flat plate and dried. The dried flat plate was then fired in an oven at a temperature of 1200° C. so that the walnut flour was burned out, creating interconnected micro pores approximately in the range of 10 microns to 30 microns. After the substrates cooled, the micro porous substrate was tested to determine whether or not liquid salt would be absorbed into the substrate. The substrate was heated to approximately 1300° F. to 1400° F. and crystals of magnesium chloride were dropped onto the substrate. The magnesium chloride crystals were observed to melt and to absorb, i.e., wick, into the porous substrate. This result was compared to a similar test conducted on a dense aluminum substrate. In that case, the liquid salt was not absorbed by the dense aluminum substrate.

It is preferred that the flat plate be drilled with a plurality of holes 22, as shown in FIGS. 3 and 4, so that a more practical design is created, that is, so that the molten metal may freely pass through the plate, i.e., the plate will not block the flow of molten metal.

EXAMPLE 2

The ceramic slurry, as prepared in Example 1 with walnut flour added thereto, was used to impregnate a 10 ppi reticulated urethane foam. The impregnated foam was fired at 1200° C. to set a high temperature bond and to burn out the walnut flour and urethane foam precursor. A ceramic foam filter was thus formed having micro pores in the solid structure, as described and shown in reference to FIGS. 5 through 9.

EXAMPLE 3

A ceramic slurry, as set forth in Example 1, was prepared and modified by the walnut flour. The slurry was then extruded through a round die and cut into pellets. The pellets were dried and fired so that a plurality of small micro porous pellets, as described in reference to FIGS. 1 and 2, were formed.

EXAMPLE 4

The salt filter materials described in Examples 2 and 3 above have been tested in an aluminum filtration environment, whereby a standard non-porous ceramic foam filter was used downstream of the salt filter materials. The molten aluminum was known to be contaminated with magnesium chloride. The non-porous ceramic foam filter was analyzed and there was no indication of any liquid salt material being retained. However, there was evidence of salt retention in both the micro porous foam filter and the micro porous pellets.

EXAMPLE 5

The use of micro porous pellets, as described in FIGS. 1 and 2, were also tested in an aluminum filtration system which utilized a standard ceramic filter. A plurality of micro porous pellets were piled on top of the ceramic foam filter. The pellets were upstream from the ceramic foam filter. A layer of micro porous pellets, about 1.5 inch thick, were distributed on top of the ceramic foam filter. In this experiment, a second ceramic foam filter was placed over the top, i.e., upstream, of the pellets. After a flow through the pellets of aluminum, the chlorine content, i.e., the salt content, of the pellets which were used in the experiment and pellets which had not been used were compared. Measurements showed that an unused pellet contained approximately 20 ppm chlorine while the used pellets contained approximately 600 ppm chlorine.

From the foregoing description of the preferred embodiments of the invention, it will be apparent that many modifications may be made therein. For example, the invention may be utilized to remove other liquid salts from liquid metals, such as, for example, sodium chloride, potassium chloride, aluminum oxychloride, magnesium fluoride, sodium fluoride, aluminum fluoride, calcium chloride and calcium fluoride, and also is useful in removing liquid salts from metals other than aluminum. It should be understood, therefore, that the preferred embodiments of the invention are exemplifications of the invention only and that the invention is not limited thereto. It is to be understood, therefore, that it is intended in the appended claims to cover all modifications as fall within the true spirit and scope of the invention.

We claim:

1. A filter for removing liquid salts from liquid aluminum metal comprising:

at least one substrate; said substrate is made of a material which resists wetting by liquid aluminum metal; said substrate having an outer surface; said outer surface of said substrate having a plurality of pores therein; said pores having a diameter of at least 5 microns; said porous substrate being wetted by liquid salts and non-wetted by liquid aluminum metal, whereby liquid salts may be captured within said pores of said substrate and separated from said liquid aluminum metal.

2. A filter as set forth in claim 1, wherein the pore size range is 5 to 120 microns in diameter.

3. A filter as set forth in claim 1, wherein said material is taken from the group consisting of boron glass, aluminum nitride, aluminum titanate, graphite, and calcium oxide.

4. A filter as set forth in claim 3, wherein a filler is added to said material.

5. A filter as set forth in claim 1, wherein said at least one substrate includes a plurality of substrates; said plurality of substrates adapted to be placed adjacent to one another.

6. A filter as set forth in claim 5, wherein said plurality of substrates are pellets.

7. A filter as set forth in claim 5, wherein said plurality of substrates are spheres.

8. A filter as set forth in claim 5, wherein said plurality of substrates are irregularly shaped objects.

9. A filter as set forth in claim 5, wherein said plurality of substrates are parallel plates.

10. A filter as set forth in claim 1, wherein said substrate is in the form of reticulated ceramic foam, whereby liquid metal may pass therethrough.

11. A filter as set forth in claim 1, wherein said substrate is a plate having a plurality of channels therethrough, whereby liquid metal may pass therethrough.

12. A method for separating liquid salts from liquid aluminum metal utilizing at least one porous substrate, having pores which are at least 5 microns in diameter, which is wettable by liquid salts and non-wettable by liquid aluminum metal comprising the steps of:

inserting the porous substrate into a container;

adding a quantity of liquid aluminum metal which is contaminated with an amount of liquid salt to the container;

contacting said porous substrate with salt contaminated liquid;

wetting said porous substrate with liquid salt;

capturing the liquid salt by absorbing the liquid salt into the porous substrate;

removing the porous substrate having the captured liquid salt from the container.

13. A method as set forth in claim 12, further including the step of moving liquid metal through the substrate.

14. A method as set forth in claim 12, further including the step of forming a pile of porous substrates in contact with one another and moving liquid metal through the pile of porous substrates.

15. A method as set forth in claim 12, further including the step of placing said substrate adjacent to a metal filter.

16. A method as set forth in claim 12, wherein the molten salt is taken from the group consisting of magnesium chloride, sodium chloride, potassium chloride, aluminum oxychloride, magnesium fluoride, sodium fluoride, potassium fluoride, aluminum fluoride, calcium chloride and calcium fluoride.

17. A system for removing liquid salts from liquid aluminum metal comprising:

a container for channelling liquid aluminum metal in a stream of flow;

a first solid inclusion removal filter received in said container;

a salt removal filter received in said container; said salt removal filter located upstream in the metal flow from said first solid inclusion removal filter; said salt removal filter including at least one substrate; said substrate having an outer surface; said outer surface of said substrate having a plurality of pores therein; said pores having a diameter of at least 5 microns; said porous substrate being wetted by liquid salts and non-wetted by the liquid aluminum metal, whereby liquid salts may be captured within said pores of said substrate and separated from the liquid aluminum metal.

18. A system as set forth in claim 17, further including a second solid inclusion removal filter received in said container; said second solid inclusion removal filter located upstream from said liquid salt removal filter; said second solid inclusion removal filter being coarser than said first solid inclusion removal filter.

19. A system as set forth in claim 18, wherein said at least one substrate includes a plurality of substrates; said plurality of substrates adapted to be placed adjacent to one another and being sandwiched between said first solid inclusion removal filter and said second solid inclusion removal filter.

* * * * *